UNITED STATES PATENT OFFICE 2,443,583

MANUFACTURE OF ASCORBIC ACID

Hugh H. Mottern and Robert E. Buck, Philadelphia, Pa.

No Drawing. Application July 12, 1944, Serial No. 544,620

14 Claims. (Cl. 260—344.5)

(Granted under the act of March 3, 1883, as amended April 30, 1928; 370 O. G. 757)

This application is made under the act of March 3, 1883, as amended by the act of April 30, 1928, and the invention herein described and claimed, if patented, may be manufactured and used by or for the Government of the United States of America for governmental purposes without the payment to us of any royalty thereon.

This invention relates to ascorbic acid and the general object is the recovery of it from various sources.

Another object is to recover ascorbic acid in substantially pure and concentrated form suitable for ingestion as such or in combination with foods as a fortifier. Another object is the purification of ascorbic acid solutions.

An additional object is to increase the utilization of citrus peel as a raw material by increasing the number of by-products obtainable therefrom.

A further object is to provide a coordinated process of obtaining ascorbic acid from its source materials, such as citrus peel, which will not interfere with the recovery of other by-products, including peel oil, citric acid, pectin, feed and molasses.

Ascorbic acid was first isolated from orange juice by precipitation as the lead salt after eliminating the citric acid. Yields by this method are poor since there is only 0.05 percent ascorbic acid in orange juice and the handling of this dilute solution to eliminate the citric acid exposes the ascorbic acid to oxidation under conditions which are very favorable for its destruction. The lead salt so obtained is impure and requires further treatment for purification. Special copper-free reagents must be used; otherwise, the destruction of ascorbic acid proceeds so fast that all of it will be lost. Due to the slight solubility of lead ascorbate and the low concentration involved, precipitation is not complete. Moreover, if the ascorbic acid is to be ingested, special care must be taken to eliminate the lead because this metal is toxic, its effect being cumulative even when ingested in small quantities in foods in a concentration not much larger than seven parts per million.

In general, our process comprises extracting the ascorbic acid from source materials in such a way that there is no appreciable loss due to oxidation, followed by absorption from the extract on a bed of anion-exchange material, and recovery of the ascorbic acid in a concentrated solution from which it may be obtained in crystalline form if desired. Absorption of the ascorbic acid on the anion-exchange material results in purification, inasmuch as the non-acidic materials in the extract are not absorbed.

In our process, we have made use of the absorptive power of certain anion-exchange materials. These materials have been used to remove acids from water in the art of water purification and to recover certain organic acids, namely, tartaric acid.

Anion-exchangers were not previously known to absorb lactones unless first converted into acids. Ascorbic acid is, in fact, a lactone rather than an acid, the name given to this compound being a misnomer since it possesses no carboxyl group, being more properly named from its structure, 3-keto-1-gulo-furano-lactone. Its structure may be represented as follows:

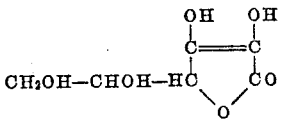

We have found that this lactone is absorbed by the anion-exchangers without first converting it to acid and is also recovered as the lactone.

While other materials may contain ascorbic acid in sufficient quantities to warrant their use on a commercial basis, we have applied our process to citrus peel in which the acid occurs in amounts up to 0.25 percent. It may also be applied to citrus juices, tomato, or other plant juices or extracts of ascorbic acid bearing plants, such as pine needles, maple leaves, alfalfa, rose hips, paprika, or to reaction mixtures obtained in the synthetic production of the acid.

We have found the peel of citrus fruits, orange, lemon, grapefruit, and tangerine, to be excellent sources of ascorbic acid by our method. There is very little unstable dehydro-ascorbic acid present in these materials. Also, oxidizing enzymes acting on ascorbic acid appear to be absent or inactive under the conditions that obtain in the process. We have found orange peel to contain from 0.10 to 0.17 percent, grapefruit peel from 0.10 to 0.24 percent, tangerine peel 0.14 percent, and lemon peel 0.20 percent ascorbic acid.

In the processing of oranges, grapefruit, and lemons for canning and freezing, large quantities of citrus peel accumulate at the plant. This peel may be processed for flavoring oils, citric acid, pectin or cattle feed. Quite often its sanitary disposal becomes quite a problem. Drying for dairy feed is more often a means of disposal than a profitable operation. During the processing of peel for dairy feed, the ascorbic acid is largely lost. However, the process described hereinafter leaves the peel in condition for processing for dairy feed or pectin manufacture.

In accordance with our process, a water extract is first made of the comminuted plant material, such as citrus peel. A counter-current system of extraction is preferred in order to obtain as high a concentration as possible of ascorbic acid in the extract. For a more profitable operation of the process, a mechanical extractor can be used.

In order to prevent oxidation of ascorbic acid during the extraction and subsequent handling of the material, the freshly sliced or comminuted material is contacted with an oxidation-preventing substance. We have found a solution of ammonium hydrosulfide containing 0.04 percent, by weight, hydrogen sulfide relative to the peel to be highly satisfactory for this purpose, although either sodium sulfide or potassium sulfide can also be used. The active constituent is hydrosulfuric acid which reduces any dehydro-ascorbic acid present to ascorbic acid and prevents the formation of the readily destroyable dehydro-ascorbic acid. The ammonium hydrosulfide reacts with the natural acids present in the peel to form hydrosulfuric acid, or sufficient acid such as sulfuric or oxalic may be added to keep the acidity below pH 5.0 during the extraction. Hydrosulfuric acid is toxic and dangerous to handle in large quantities where workers would be exposed to fumes, but by adding it as a salt and liberating the acid in situ, the concentration is very small and most of it is consumed in reducing dehydro-ascorbic acid or otherwise destroyed without creating a nuisance. The ammonium hydrosulfide solution is added to the hot water used in blanching and extracting the ascorbic acid, or it may be added to the peel before the blanching and extraction process.

We have also used aluminum chloride and aluminum sulfate solutions to prevent oxidation of ascorbic acid, but these substances are not as effective as hydrosulfuric acid and seem to owe their oxidation-preventing property to their acid character. Aluminum salts do retard the solution of pectin so that more moisture can be pressed from peel extracted with dilute solutions of aluminum salts.

In carrying out the process, we slice citrus peel approximately $\frac{1}{16}$ of an inch in width and add this sliced peel to boiling hot, cation-exchanger treated water containing the ammonium sulfide. The ammonium sulfide is added after the water is heated to boiling and just before the peel is added. The heating is continued to maintain a temperature of about 190° F. for approximately 15 minutes, after which the excess liquid is drained off and the residue pressed in a roller or hydraulic press. The heating inactivates oxidizing enzymes in the peel and wilts the tissue so that the ascorbic acid is readily extracted. Higher temperatures, such as 212° F., for 5 to 7 minutes will accomplish the same results, but since a few additional minutes must be allowed for the water to extract the ascorbic acid, we prefer to carry out the combined blanching and extraction at 190° F. for approximately 15 minutes. Temperatures much below 190° F. do not accomplish the blanching effect and result in a poor degree of extraction. Prolonged heating at temperatures much above 190° F. results in cooking and softening of the peel, making it difficult to press out the extract.

The extract drained from the peel and pressed out is then clarified sufficiently to pass through the exchanger beds. This is accomplished by centrifuging or straining through a screen of 100 to 150 mesh to the inch to remove particles of solids which might clog the exchanger beds.

The ascorbic acid is then passed through a bed of cation-exchange material, such as that described in United States Patent No. 2,104,501, in order to convert salts into free acids for ready absorption. The liquor is then passed through a bed of anion-exchange material, such as that described in United States Patents Nos. 2,151,883 and 2,226,134. The cation-exchange material is a condensation product obtained by the interaction of formaldehyde or equivalent methylene bodies with polyhydric phenol bodies and their derivatives or, more specifically, a methylene sulfonic acid derivative of a phenol formaldehyde condensate. The anion-exchange materials used are either a basic oxidation product of an organic aromatic amine or a condensation product of formaldehyde with an aromatic amine, such as m-toluidine, m-ethylaminobenzene, sym-m-xylidene, and m-phenylene-diamine.

Instead of allowing the ascorbic acid solution to flow over a bed of the exchange material, the exchange material may be added batch-wise and separated from the extraction liquor by filtration or centrifuging. The ascorbic acid and other organic acids, such as citric acid, will be absorbed on the exchanger material. As an example, an extract of orange peel containing 0.06 mg. per ml. ascorbic acid was passed through an experimental column of anion-exchange material; the ascorbic acid was removed from the anion-exchange material with a solution of sulfuric acid; the elutriated liquor reached a concentration of 0.21 mg. per ml. equal to 3½ fold concentration. More than one hundredfold concentration is possible. There is a differential absorption of citric and ascorbic acids depending on the operating conditions and the exchanger material used. For example, we have found anion-exchange material to absorb citric acid preferentially. In this way, a complete separation of part of the ascorbic acid or a partial separation of the total acids can be made. Thus, there can be obtained pure ascorbic acid, pure citric acid, and a mixture of the two acids absorbed in different layers of the exchanger bed or in different beds used in series. We offer no explanation for the phenomenon of preferential absorption of various acids by anion-exchangers, but it appears to depend upon a number of factors, including degree of ionization, molecular size, and concentration (mass action).

In order to recover the ascorbic and other organic acids from the exchanger material, a solution may be used of an acid, such as sulfuric acid, in sufficient concentration to displace the organic acids. Sodium carbonate ordinarily used for regeneration would oxidize and destroy the ascorbic acid, although it may be used for the recovery of other organic acids not susceptible to oxidation in alkaline solution. A solution of sulfuric acid for elutriating the ascorbic acid is desirable because of the ease with which the excess can be eliminated from the elutriated ascorbic acid solution. In order to build up the concentration of ascorbic acid in the acid washing of an exchanger bed loaded with ascorbic acid, the same acid elutriating liquor may be used for this purpose for a number of loaded beds, adding more sulfuric acid if necessary. When the concentration of ascorbic acid has been built up in this way to a satisfactory degree of concentration, the excess sulfuric acid may be eliminated by precipitation as the calcium or barium salt and the ascorbic acid recovered as crystalline material in any of the ways known to the art.

After displacing the organic acids on the anion-exchanger with sulfuric acid, the exchanger bed may be regenerated with a solution of sodium carbonate or alkali. Even after thorough rinsing the bed may still remain alkaline. In order to prevent loss of ascorbic acid from the extract first coming into contact with the alkaline bed we partially acidify the bed with a solution of a weak acid such as carbonic or hydrosulfuric, which is displaced from the bed by ascorbic acid.

Instead of a water extract as source material for the ascorbic acid, a plant juice may be used, such as citrus or pineapple juice. After filtering to obtain a clear liquor, the juice may then be acidified and otherwise prepared for anion-exchanger treatment, as hereinabove described.

With fruit juices or extracts containing salts of organic acids, the liquor may first be passed through a bed of cation-exchange material or acidified with a highly ionized mineral acid in order to convert the salts into the free acids for ready absorption.

Citrus peel extracted with distilled or cation-exchanger treated water has been found to be in an excellent condition for preparing pectin because of its low ash content. It may also be used for cattle feed manufacture. The extract, after removal of the ascorbic acid, contains sugars and may be used for yeast production or concentrated in multiple effect evaporators to molasses and added to the dried pulp to give a feed of high carbohydrate value.

The following examples will further illustrate our invention:

*Example I*

Forty kg. of orange peel containing 0.12 percent ascorbic acid was sliced $\tfrac{1}{8}$ inch wide and immersed in 87 kg. of boiling cation-exchanger treated water to which was added 200 ml. of an ammonium hydrosulfide solution containing 8 percent hydrogen sulfide and 80 ml. of 5 normal sulfuric acid. The mass was heated to 190° F. for 15 minutes, after which it was pressed out on a hydraulic press. There was obtained 87 kg. of extract containing 0.044 percent ascorbic acid. The acidity was pH 4.8. On centrifuging, this extract contained 0.039 percent ascorbic acid. This clarified extract was put through a bed of resinous cation-exchange material without loss in ascorbic acid. The acidity of the effluent was pH 2.2. One liter of water saturated with hydrogen sulfide was put through a small column of anion-exchange material followed by 4 liters of the above effluent from the cation-exchanger, and 843 mg. of ascorbic acid was taken up. Five hundred ml. of 10 percent sulfuric acid was then put through the exchanger bed and 752 mg. of ascorbic acid was obtained in the recovery effluent, the concentration of ascorbic acid in the effluent rising as high as 8 times that of the original extract.

*Example II*

Ninety-one hundred g. of grapefruit peel containing 0.11 percent ascorbic acid (or a total of 10,000 mg.) was sliced $\tfrac{1}{8}$ inch thick and immersed in 18 kg. of boiling cation-free water heated with live steam. The heating was continued for seven minutes at 205° F. whereupon 9 kg. of cation-free water was added. The resulting temperature was 170° F. After 15 minutes, the peel was pressed out in a hydraulic press. The extract weighed 38 kg. and contained 0.017 percent ascorbic acid or a total of 6,460 mg. The residue weighed 6.75 kg. and contained 0.023 percent ascorbic acid or a total of 1540 mg. In this case, no ammonium sulfide was used to prevent oxidation and there was a loss of 21 percent of the ascorbic acid.

As suitable ion-exchange materials for carrying out the process herein described, many of the commonly known substantially insoluble ion-exchangers may be used. Any of the newer organic substances of the synthetic resin type which have no effect on ascorbic acid are, as examples, suitable cation-exchange materials. Suitable anion-exchange or acid-absorption materials include, but are not limited to those such as synthetic amine resins, granular aniline black (emeraldine) keratiniferous materials or other solid materials which can absorb acid, are resistant to acid, and which can be regenerated for reuse. We prefer as most suitable anion-exchange material, the synthetic amine resins and as a most suitable cation-exchange material, the resin type of material.

Having thus described our invention, we claim:

1. The process comprising contacting a solution of ascorbic acid with hydrosulfuric acid, absorbing the ascorbic acid of the solution on an anion-exchanger and then releasing it from the exchanger with a highly ionized acid solution.

2. The process comprising contacting a solution containing ascorbate ions with ammonium sulfide and then converting salts present in said solution to the free acids by contacting the solution with cation exchange material consisting of a product obtained by the interaction of a methylene body with a polyhydric phenol, absorbing ascorbic acid from the solution on anion exchange material which has been neutralized after alkali regeneration, and then contacting the loaded anion exchanger with a highly ionized acid solution to effect release of the ascorbic acid.

3. The process comprising contacting a solution containing ascorbate ions with hydrosulfuric acid and then with an acid regenerated cation exchange material consisting of a methylene sulfonic acid derivative of a phenol formaldehyde condensate thereby converting salts present in said solution to the free acids, absorbing ascorbic acid from the solution on anion exchange material which has been neutralized after alkali regeneration, and then contacting the loaded anion exchanger with a highly ionized acid solution to effect release of the ascorbic acid.

4. The process comprising contacting a solution containing ascorbate ions with hydrosulfuric acid and then with cation exchange material consisting of a product obtained by the interaction of a methylene body with a polyhydric phenol thereby converting salts present in said solution to the free acids, absorbing ascorbic acid from the solution on anion exchange material which has been neutralized after alkali regeneration, said anion exchange material being a condensation product of formaldehyde with an aromatic amine, and then contacting the loaded anion exchanger with a highly ionized acid solution to effect release of the ascorbic acid.

5. The method of segregating ascorbic acid which comprises absorbing it from an aqueous medium on an anion exchange material and displacing it from the anion exchange material with a highly ionized acid solution.

6. The process comprising absorbing ascorbic acid from an aqueous solution on an anion exchange material consisting of an oxidation product of an aromatic amine and then displacing it from the anion exchange material with a highly ionized acid solution.

7. The process comprising absorbing ascorbic acid from an aqueous solution on an anion exchange material, said anion exchange material consisting of a condensation product of formaldehyde with an aromatic amine, and then displacing the ascorbic acid from the anion exchanger with a highly ionized acid solution.

8. The process comprising inhibiting oxidation of ascorbic acid by contacting an aqueous solution containing ascorbate ions with hydrosulfuric acid, absorbing the ascorbic acid from the solution on an anion exchange material consisting of an oxidation product of an aromatic amine and then displacing it from the anion exchange material with a highly ionized acid solution.

9. The process comprising inhibiting oxidation of ascorbic acid by contacting an aqueous solution containing ascorbate ions with hydrosulfuric acid, absorbing the ascorbic acid from the solution on an anion exchange material consisting of a condensation product of formaldehyde with an aromatic amine and then displacing the ascorbic acid from the anion exchange material with a highly ionized acid solution.

10. The process comprising converting salts present in an aqueous solution containing ascorbate ions to the free acids, absorbing the ascorbic acid from the solution on an anion exchange material and displacing it from the anion exchange material with a highly ionized acid solution.

11. The process as defined in claim 10 wherein conversion of the salts to the free acids is effected by contacting the solution with a cation exchange material consisting of a product obtained by the interaction of a methylene body with a polyhydric phenol.

12. The process comprising inhibiting oxidation of ascorbic acid by contacting a solution containing ascorbate ions with hydrosulfuric acid, converting salts present in said solution to the free acids by contacting the solution with a cation exchange material consisting of a product obtained by the interaction of a methylene body with a polyhydric phenol, then absorbing the ascorbic acid from the solution on an anion exchange material and displacing it from the anion exchange material with a highly ionized acid solution.

13. The process comprising inhibiting oxidation of ascorbic acid by contacting a solution containing ascorbate ions with hydrosulfuric acid generated by the action of said solution in an acidic condition on ammonium sulfide, then converting salts present in the solution to the free acids by contacting the solution with an acid regenerated cation exchange material consisting of a methylene sulfonic acid derivative of a phenol formaldehyde condensate, absorbing ascorbic acid from the solution on an anion exchange material which has been neutralized after alkali regeneration, said anion exchange material being a condensation product of formaldehyde with an aromatic amine and then contacting the loaded anion exchanger with a highly ionized acid solution to effect release of the ascorbic acid.

14. A process comprising converting salts present in an aqueous solution containing ascorbate ions to the free acids by contacting said solution with a cation exchange material selected from the group consisting of a product obtained by the interaction of a methylene body with a polyhydric phenol and a methylene sulfonic acid derivative of a phenol formaldehyde condensate, absorbing the ascorbic acid from the solution on an anion exchange material and displacing it from the anion exchange material with a highly ionized acid solution.

HUGH H. MOTTERN.
ROBERT E. BUCK.

REFERENCES CITED

The following references are of record in the file of this patent:

UNITED STATES PATENTS

| Number | Name | Date |
|---|---|---|
| 2,253,061 | Cole | Aug. 19, 1941 |
| 2,323,483 | Myers | July 6, 1943 |

OTHER REFERENCES

Elving: Proceedings Indiana Acad. Sciences for 1941, published 1942, pages 136–145. Photostat in Division 50.